United States Patent [19]

Sano et al.

[11] Patent Number: 5,971,276
[45] Date of Patent: Oct. 26, 1999

[54] METHOD OF READING PATTERN AND OPTICAL SIGNAL READER

[75] Inventors: Kenji Sano, Tokyo; Taeko I. Urano, Kawasaki; Hideyuki Nishizawa, Tokyo; Mitsunaga Saito, Ichikawa; Kenji Todori, Yokohama, all of Japan

[73] Assignee: Kabushiki Kaisha Toshiba, Kawasaki, Japan

[21] Appl. No.: 08/798,302

[22] Filed: Feb. 7, 1997

[30] Foreign Application Priority Data

Feb. 8, 1996 [JP] Japan ................................... 8-022664
Jan. 31, 1997 [JP] Japan ................................... 9-019223

[51] Int. Cl.⁶ .................................................. G06K 7/10
[52] U.S. Cl. ...................................... 235/462.01; 235/468
[58] Field of Search .............................. 235/462.01, 468; 283/91, 88, 82–85, 89; 428/195, 199, 206

[56] References Cited

U.S. PATENT DOCUMENTS 4,983,817  1/1991  Dolash et al. ............................ 235/455
5,087,601  2/1992  Hotta et al. ............................. 503/200
5,298,476  3/1994  Hotta et al. ............................. 503/201
5,401,960  3/1995  Fisun et al. ............................. 250/271
5,503,904  4/1996  Yoshinaga et al. ...................... 428/195
5,522,623  6/1996  Soules et al. ............................ 283/91

FOREIGN PATENT DOCUMENTS

0473403A2   4/1992   European Pat. Off. .
55-37658    3/1980   Japan .
6-337955   12/1994   Japan .
7-242087    9/1995   Japan .

Primary Examiner—Thien Minh Le
Assistant Examiner—Diane I. Lee
Attorney, Agent, or Firm—Oblon, Spivak, McClelland, Maier & Neustadt, P.C.

[57] ABSTRACT

A method of reading a pattern including steps of heating or irradiating with infrared light a substrate on which a transparent pattern is formed, the pattern containing a material capable of absorbing infrared light of specific wavelength such as polyacrylonitrile, and detecting infrared light which is radiated or reflected from the pattern.

10 Claims, 8 Drawing Sheets

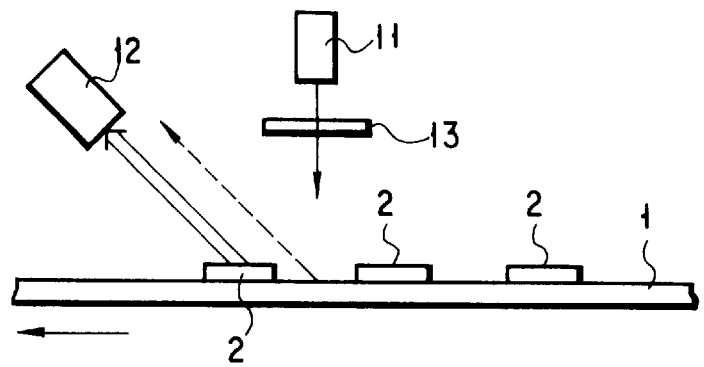
F I G. 1
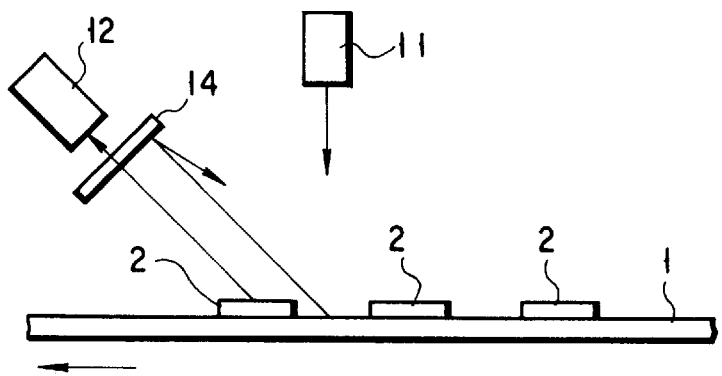
F I G. 2
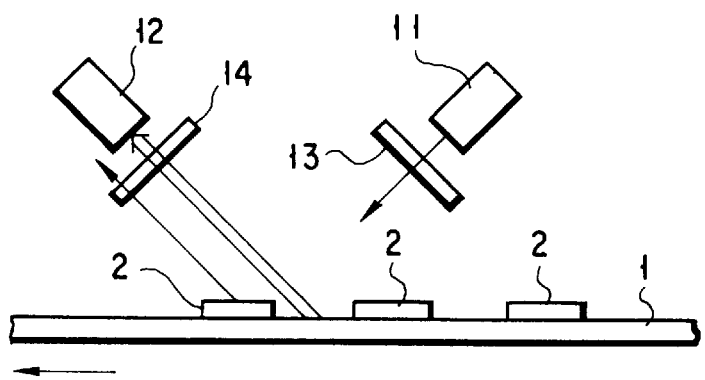
F I G. 3

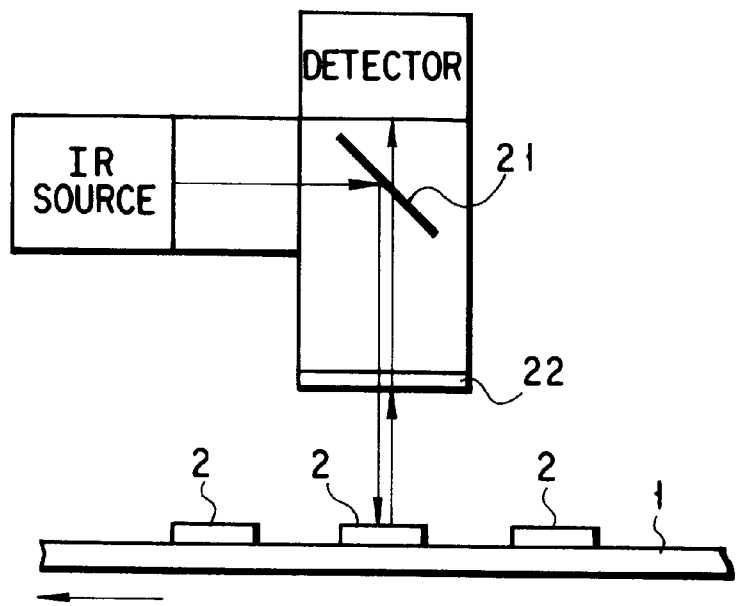
F I G. 4
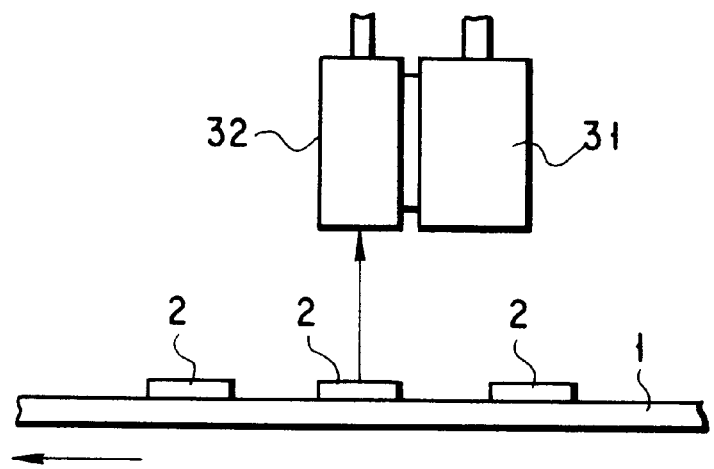
F I G. 5

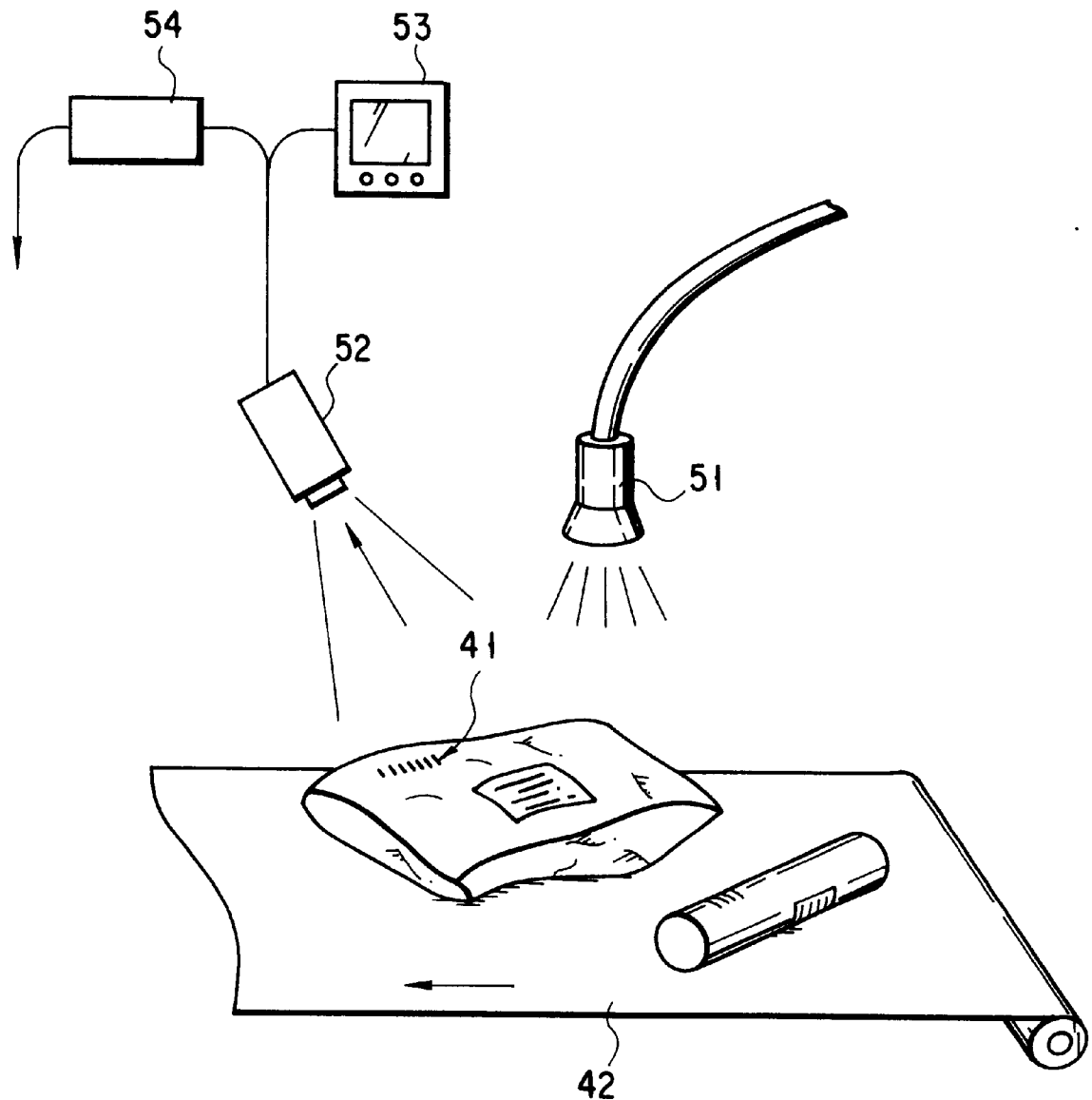
F I G. 6

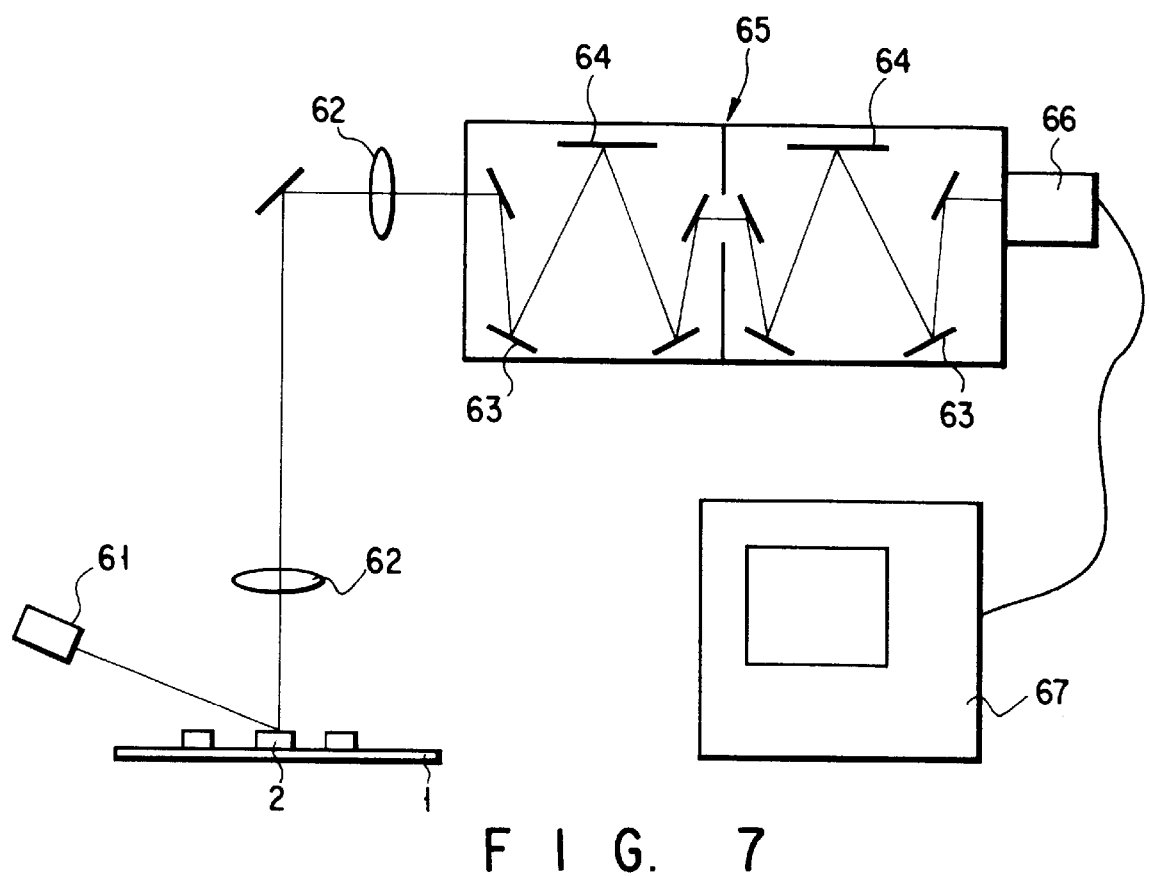
F I G. 7
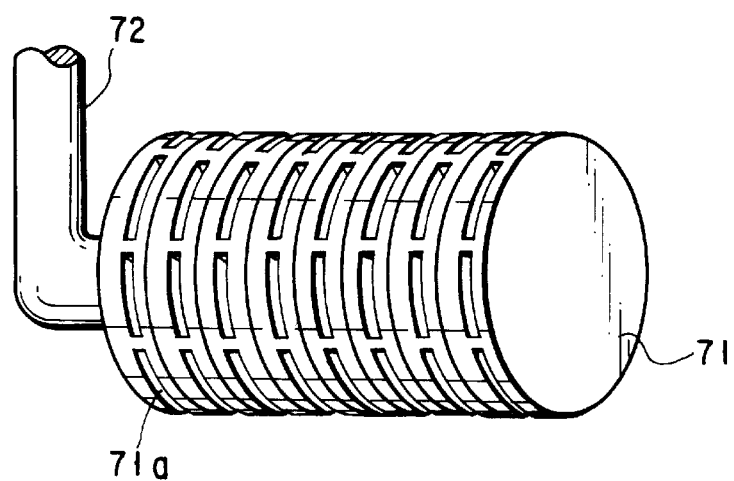
F I G. 8

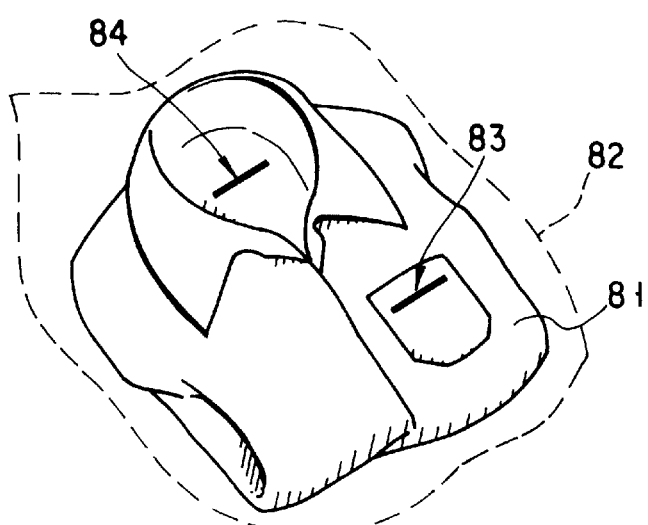
F I G. 9
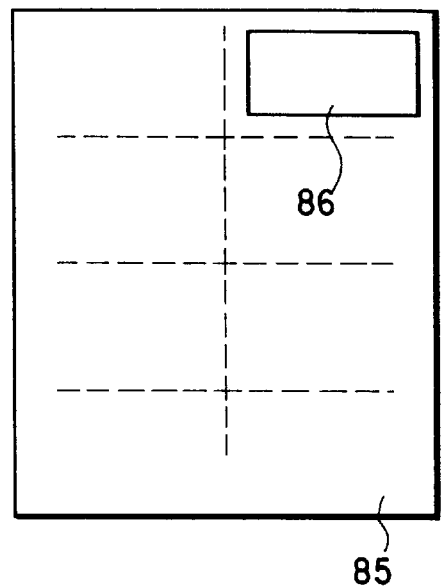
F I G. 10
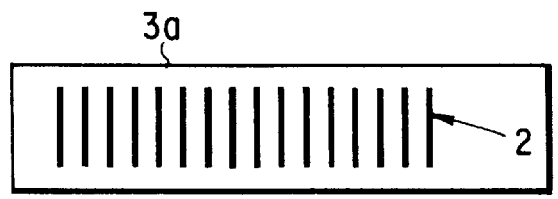
F I G. 11A
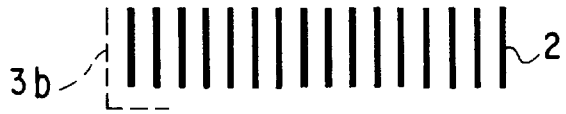
F I G. 11B
F I G. 11C

METHOD OF READING PATTERN AND OPTICAL SIGNAL READER

BACKGROUND OF THE INVENTION

This invention relates to a method of reading a pattern such as a bar cord pattern which is useful in postal service, in distribution business or in management of confidential documents or articles, and also relates to an optical signal reader for reading signal from such a pattern.

In recent years, a system for automatically inputting information by making use of bar code has been studied in various fields of industry. For example, there has been an attempt to print bar code corresponding to zip code and address on the surface of mails such as postal cards so as to allow to sort mails automatically by reading the bar code on the mails, thereby enhancing the efficiency of postal service. There has been also proposed a system in hospital wherein bar code corresponding to medical chart is printed on the surface of a consultation ticket for the patient so that as soon as the bar code on the consultation ticket is read by bar code reader, the medical chart can be automatically transferred from file stacks to a doctor. Furthermore, the application of bar code is also studied for an automatic retrieval system of official documents in government office, for a management system for the entry and delivery of clothes in dry-cleaning business, for an automatic retrieval system of training record from a training card in driver's school, or for a storage system of various goods.

In the application of bar code for these systems, various problems are raised if the bar code is printed with the conventional black ink. For example, since characters indicating address are already written on the surface of mail, if the bar code array newly printed on the surface of mail is overlapped with these characters, the signals to be detected from the bar code may be accompanied with noise, thus making it difficult to read information correctly from the signals. This problem may become more serious when the length of the bar code array becomes longer for recording much information. Moreover, the black bar code printed on the mail not only spoils the appearance of the mail but may make the characters already written thereon unreadable.

Even if a color ink containing orange, blue or brown dye is employed in place of black ink for printing bar code, the same problem as in the case of bar code made of a black ink would be raised if the colored bar code is overlapped with the characters already written on the mail. Further, there are also problems that some of dyes are harmful to human body and that many dyes are easily subjected to photo-degradation.

With a view to solve these problems, novel material for forming bar code has been studied. For example, the employment of a fluorescent material which is capable of absorbing ultraviolet light and emitting fluorescence in visible region is studied to form transparent bar code. In this case, the region including bar code is irradiated with ultraviolet light as excitation light to cause fluorescence in visible region to emit, and the resultant fluorescence is detected as signals. Since the bar code in this case is transparent in the ordinary conditions, the readability of the characters already written on the mail would not be hindered even if the bar code is overlapped with the characters. However, there is another problem that since white paper used for postal cards, for instance, generally contains fluorescent whitening agent, noise of considerable magnitude as compared with the signal from the bar code is detected from the paper, whereby deteriorating the S/N ratio.

BRIEF SUMMARY OF THE INVENTION

Accordingly, an object of the present invention is to provide a method of reading a signal with a high S/N ratio from a transparent pattern (invisible pattern) which is free from any trouble in reading a signal from the pattern or in reading characters already written even if the pattern is overlapped with the characters.

Another object of the present invention is to provide an optical signal reader for reading a signal from such a transparent pattern as described above.

A method of reading a pattern according to the present invention comprises steps of heating or irradiating with infrared light a substrate on which a transparent pattern (invisible pattern) is formed, the pattern containing a material capable of absorbing infrared light of specific wavelength, and detecting infrared light from the pattern.

An optical signal reader according to the present invention comprises means for conveying a substrate on which a transparent pattern is formed, the pattern containing a material capable of absorbing infrared light of specific wavelength, means for heating or irradiating with infrared light a region of the pattern formed on the substrate, and means for detecting infrared light from the pattern.

According to the present invention, there is also provided a method of preventing counterfeiting of a certification document on which visible information for certification is formed comprising steps of: forming a transparent pattern corresponding to the visible information on the document, the pattern containing a material capable of absorbing infrared light of specific wavelength; heating or irradiating with infrared light a region of the pattern on the substrate; detecting infrared light from the pattern; and comparing information detected from the pattern with the visible information.

According to the present invention, there is further provided a method of preventing counterfeiting of a prepaid card in which magnetic information is recorded comprising steps of: forming a plurality of transparent patterns corresponding to remaining sums on the prepaid card; punching one of the patterns corresponding to a remaining sum available for use at the time when the prepaid card is used, thereby making a hole; heating or irradiating infrared light a region of the patterns on the prepaid card; detecting infrared light from the patterns; and comparing information detected from the patterns with the magnetic information recorded in the prepaid card.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a schematic view explaining the principle of a reader for a pattern formed according to the present invention;

FIG. 2 is a schematic view explaining another principle of a reader a pattern formed according to the present invention;

FIG. 3 is a schematic view explaining still another principle of a reader for a pattern formed according to the present invention;

FIG. 4 is a schematic view showing an example of an optical signal reader for a pattern formed according to the present invention;

FIG. 5 is a schematic view showing another example of an optical signal reader for a pattern formed according to the present invention;

FIG. 6 is a schematic view showing still another example of an optical signal reader for a pattern formed according to the present invention;

FIG. 7 is a schematic view showing still another example of an optical signal reader for a pattern formed according to the present invention;

FIG. 8 is a perspective view showing a bar code character rings;

FIG. 9 is a plan view illustrating the position of printing a transparent bar code pattern onto a shirt;

FIG. 10 is a plan view illustrating the position of printing a transparent bar code pattern onto a bed sheet;

FIGS. 11A, 11B, and 11C respectively shows a plan view illustrating a mark to be formed in the vicinity of a transparent bar code pattern;

DETAILED DESCRIPTION OF THE INVENTION

Figure 12:
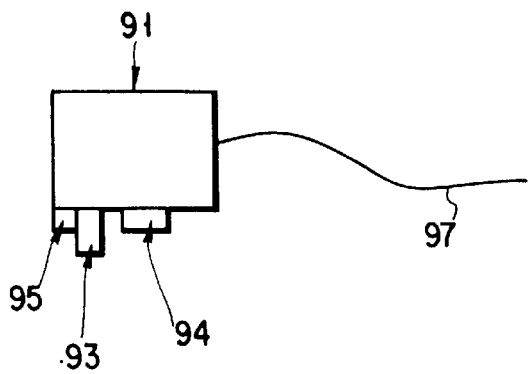
FIG. 12 is a schematic view showing the construction of an optical signal reader for reading a transparent pattern with a colored mark in the vicinity thereof.

As mentioned above, the method of reading a pattern according to this invention comprises steps of heating or irradiating with infrared light a substrate on which a transparent pattern is formed, the pattern containing a material capable of absorbing infrared light of specific wavelength, and detecting infrared light radiated or reflected from the region of the pattern. In the present invention, the material used for the pattern absorbs infrared light of peculiar wavelength range. Also, there is used a detector capable of sensing above peculiar wavelength range.

As for the shape of the pattern to be formed on the substrate according to this invention, there is no particular restriction, i.e., the shape of pattern may be a linear bar code symbol consisting of bars and spaces, or any other shape such as a two-dimensional symbol. The pattern formed on a substrate according to this invention is made of a transparent material, i.e., a material that is colorless and transmits light in the visible region. Therefore, there is no possibility of raising problems of difficulties in reading signals from the pattern and reading characters that are already written even if the pattern is overlapped with the characters, unlike the conventional methods in which a black ink or a colored ink containing a dye is used for the pattern.

In the present invention, a preferable material used for the pattern such as bars of bar code to be formed on a substrate is a transparent material containing a compound having a cyano group. Generally, the material containing a polymer as a main component may be used for forming the pattern. More specifically, a polymer having cyano groups or a mixture comprising any base polymer and a low molecular-weight compound having cyano groups may be used for forming the pattern. Specific examples of polymer having cyano groups include polyacrylonitrile and acrylonitrile-based copolymer. An example of the low molecular-weight compound having a cyano group is cyanobiphenyl.

These materials are dissolved in a suitable solvent, and the resultant solution is printed on a substrate by a suitable printing method and dried thus forming a pattern. Although there is not any particular restriction as to the method of printing the pattern, the employment of a high speed printing method is preferred. Examples of such a high speed printing method are a printing method by an ink jet printer, a bubble jet printer or an ultrasonic ink jet printer using a transparent ink formed of a solution containing a polymer as a main component; a printing method by an electrophotographic printer according to the Carlson process using a transparent toner containing polymer particles as a main component; and a printing method by a bar code character rings.

Cyano group exhibits a characteristic absorption at the region of 2260 to 2240 $cm^{-1}$, which can be distinguished from the absorption spectra of other substituent groups. Meanwhile, paper used for mail, for example, does not contain cyano group. Therefore, the employment of an infrared absorbing agent containing a cyano group is advantageous in enhancing the S/N ratio. However, if the detection sensitivity of pattern can be sufficiently assured as in the case where the thermal conductivity of the material constituting the pattern is extremely higher than that of the substrate, it is possible to employ a compound having other substituent group such as carbonyl group or hydroxyl group which exhibits an infrared absorption at a region different from the aforementioned region.

In the present invention, the signal of the transparent pattern can be read by making use of an optical signal reader comprising means for conveying a substrate on which a transparent pattern containing a material capable of absorbing infrared light is formed, means for heating or irradiating with infrared light a region of the pattern formed on the substrate, and means for detecting infrared light from the region of pattern.

There is no limitation regarding the means for heating or irradiating with infrared light. For example, an infrared lamp may be employed, a hot air may be blown to the substrate, or the substrate may be contacted with a heat source such as a heat roller or a heat sink. As for the means for detecting infrared light from the pattern thus heated or irradiated with infrared light, a thermoelectric cooling type HgCdTe detector may be employed for instance. The pattern may be visualized by making use of a thermal image analysis system so as to perform an image analysis of the visualized pattern by means of an image analyzer. When infrared light reflected from the pattern region is detected, the heating means or infrared-irradiating means should preferably be arranged symmetrical with the detecting means. When the pattern is detected by a method other than detecting the infrared light reflected from the pattern, there is not any particular restriction regarding the arrangement of the heating means or infrared-irradiating means in relative to the detecting means, since the infrared light radiated from the pattern region have no directivity.

The method of reading signals from the pattern according to this invention will be further explained with reference to an example where a material having a cyano group is employed as an infrared-absorbing agent.

Referring to FIG. 1, a pattern 2 containing an infrared-absorbing agent having a cyano group is formed on the surface of a substrate 1. An infrared lamp 11 is arranged so as to irradiate a region including the pattern (hereinafter referred to as a pattern region) on the substrate with infrared light through a filter 13. If the filter 13 is capable of transmitting infrared light having a wavelength of 4 to 5 $\mu$m, the pattern containing an infrared-absorbing agent having a cyano group can be selectively heated, but the substrate 1 is not heated so much. After the pattern 2 is heated for a sufficient time to bring about a substantial difference in temperature between the pattern 2 and the substrate 1, the substrate 1 is conveyed so that the infrared light radiated from the pattern is detected by means of an infrared detector 12 to perform the reading signal from the pattern.

In the embodiment shown in FIG. 2, the substrate 1 is entirely heated by the infrared lamp 11, and after the pattern is heated for a sufficient time to bring about a substantial difference in temperature between the pattern 2 and the substrate 1, the substrate 1 is conveyed so that the infrared Light of specific wavelength radiated from the pattern is detected by means of the infrared detector 12 through a filter 14 to perform the reading signal from the pattern. The heating of the entire surface of substrate 1 may be performed by blowing a hot air onto the surface or by contacting a hot plate to the surface of substrate for a sufficient time to bring about a sufficient temperature rise of the pattern 2.

Since a filter which is capable of transmitting only infrared light of specific wavelength region is disposed at the infrared-irradiation side or at the detector side, it is possible to further enhance the S/N ratio upon reading signal from the pattern. Namely, in the case of embodiment shown in FIG. 1, for the purpose of selectively heating the pattern made of a material having cyano group, the filter capable of transmitting only infrared light of 4 to 5 $\mu$m in wavelength is disposed in front of the infrared lamp as a heating means. On the other hand, in the case of embodiment shown in FIG. 2, for the purpose of selectively detecting infrared light of specific wavelength radiated from the pattern, a similar kind of filter as mentioned above which is capable of transmitting only infrared light of 4 to 5 $\mu$m in wavelength is disposed in front of the detector. These filters may be disposed in front of both infrared lamp and detector.

The reading signal from the pattern may be performed as shown in FIG. 3. Namely, the infrared lamp 11 and the infrared detector 12 are disposed symmetrical with each other with the pattern region on the substrate being located therebetween. The substrate is conveyed at a high speed while the pattern region on the substrate 1 is irradiated through the filter 13 with infrared light corresponding to the absorption wavelength region peculiar to the cyano group from the infrared lamp 11, and the infrared light corresponding to the absorption wavelength region of cyano group reflected from the pattern region is detected by an infrared detector 12 through the filter 14, thereby to perform the reading signal from the pattern. In this case, the irradiation time of infrared light is very short so that any sufficient difference in temperature between the substrate and the pattern would not be brought about. However, since the magnitude of infrared light reflected from the pattern is relatively low due to the absorption by cyano group and the magnitude of infrared light reflected from the substrate is relatively high, it is possible to read signal from the pattern. In this case, the ON/OFF of the signals to be detected becomes opposite to the case shown in FIG. 1 or 2.

It is possible to employ an apparatus as shown in FIG. 4, wherein an infrared light source, an infrared detector, a beam splitter 21 and a filter 22 are integrated together. The infrared light from the light source is reflected by the beam splitter 21 and then passed through the filter 22 to irradiate the pattern region on the substrate 1. The infrared light reflected from the pattern 2 are passed through the filter 22 and the beam splitter 21 to be detected by an infrared detector.

It is also possible to employ an apparatus shown in FIG. 5, wherein a heater 31 and an infrared detector 32 are integrated together. The pattern region on the substrate 1 is heated by the heater 31, and then the infrared light radiated from the pattern is detected by an infrared detector 32.

It is also possible to read signal from the pattern by employing an apparatus shown in FIG. 6. A three-dimensional object 41 having a pattern printed thereon is conveyed by a conveyor 42 while being heated by a heater 51. Then the infrared light radiated from the pattern thus heated are detected by an infrared detector 52 of a thermal image analysis system and displayed on a monitor 53 thus visualizing the pattern itself, the visualized pattern being image-analyzed by means of an image analyzer 54 (a computer).

It is also possible to read signal from the pattern by detecting Raman scattering light. In this case, a material capable of emitting Raman scattering light of specific wavelength is employed for forming a transparent pattern on the surface of a substrate. The pattern region on the substrate is irradiated with light, and then Raman scattering light is detected.

In this method also, a compound having cyano group should preferably be employed as a material capable of emitting Raman scattering light. Since cyano group causes Raman scattering at a characteristic region of 2260 to 2240 $cm^{-1}$, the Raman scattering light from the cyano group can be easily distinguished from that originating from other kinds of substituent groups. As for the method of forming a pattern, various kinds of printers as mentioned above can be utilized.

Incidentally, infrared absorption and Raman scattering are brought about by the combination of various bond vibrations. Among these bond vibrations, ones which are observable with infrared absorption are defined as being infrared active, while others which are not observable with infrared absorption are defined as being infrared inactive. Likewise, these vibration types are admitted also in the case of Raman scattering, i.e. Raman active and Raman inactive. In these cases, there is an issue of parity whether the vibration is active or inactive in the vibration where the direction of vibrational displacement becomes symmetrical or asymmetrical with respect to symmetry center when an inversion operation is performed. However, the infrared inactive vibrations are often Raman active, while the Raman inactive vibrations are often infrared active. For example, the CX stretching vibration ($E_g$, $n_7$) of $C_2H_6$ exhibits absorption at about 2955 $cm^{-1}$, and is infrared inactive but Raman active. Accordingly, even if a molecular vibration may not be observed by means of infrared absorption, it may be observed by means of Raman scattering. Due to these facts, the materials used in this method are not limited to those observable only with infrared absorption but can be selected from other materials.

In this method, the pattern region on a substrate is irradiated with light and the Raman scattering light from the pattern is detected as a signal. Since the incident light in this case should preferably be monochromatic light, a laser is preferably employed as a light source. If only the Raman scattering light from CN group is desired to be detected, a light of specific wavelength is selected by making use of a spectroscope. As for the detector, a photomultiplier of high sensitivity can be employed though the dynamic range thereof is somewhat narrow. Since a charge coupled device (CCD) is capable of obtaining an image of bar code, the CCD is particularly suitable for use as a detector in this method. When an over-distributed double spectroscope or a triple spectroscope is employed in this method, it is possible to obtain an excellent wavelength resolution. If a zero-distributed double spectroscope is employed in this method, the image of outlet slit becomes identical with the image of inlet slit so that it is convenient to obtain an image wavelength-resolved by means of a CCD. When Raman spectroscope is employed in this method, a backscattering arrangement is generally adapted. In this case, signals of sufficiently high magnitude can be detected even if a thick portion exists in a polymer film constituting the pattern. Furthermore, since the pattern is detected without passing a light through the substrate, the signals can be detected irrespective of the kinds of material constituting the substrate. According to this method, the signals are obtained only from the pattern containing CN group and the signals from other regions are zero, thereby improving the S/N ratio.

An apparatus for reading signal from a pattern to be employed in this method is shown in FIG. 7. As shown in FIG. 7, the region of a pattern formed on a substrate 1 is irradiated with monochromatic light from a laser 61. The Raman scattering light from the pattern region on the substrate is converged by lenses 62 and is passed through a zero-distributed double spectroscope 65 provided with mirrors 63 and diffraction gratings 64, and then is detected by a detector 66. The Raman scattering light thus detected is analyzed by means of a computer 66 thereby to read signal from the pattern.

Although the above explanations are mainly concentrated on the cases where transparent bar code pattern is printed on a paper sheet, this invention is also applicable to cloth. Namely, transparent bar code formed of a material containing a compound having a cyano group may be printed on clothes. In this case, the transparent bar code can be printed on clothes by making use of a bar code character rings shown in FIG. 8. The bar code character rings has a number of rotatable rings 71 assembled coaxially, each ring 71 being provided with a plurality of nozzles 71a corresponding to bar pattern. A molten polymer is supplied to the bar code character rings from feed pipe 72 and kept, while being heated, in the interior of the character rings. These rings are suitably rotated so as to set a combination of bar pattern, and then the molten polymer is extruded from each of the nozzles thereby performing a hot melt coating to form a bar code pattern on the surface of clothes.

A bar code pattern may be formed on the surface of clothes by sewing a thread made of a polymer fiber containing cyano group such as polyacrylonitrile fiber. The sewing of the thread on the surface of clothes can be easily performed by using a computer-controlled sewing machine in which data on the bar code pattern are stored. In this case, it is possible to prevent the sewed thread from standing out of the clothes by employing a thread of the same color as that of the clothes. The thread formed of acrylic fiber is unharmful to human body and is free from discoloring or decoloring by sweat. The bar code made of the thread of acrylic fiber would not be damaged and can be read without fail even if dry cleaning, washing with water, spin-drying or sunlight drying is repeated a number of times.

There is any particular restriction with respect to the kind of bar code. However, the employment of two-dimensional symbol such as Data Code or Veri Code is preferable because the bar code is formed on a uneven surface of cloth. Furthermore, these two-dimensional symbols are advantageous in recording more information.

According to this invention, the management of dry cleaning service by making use of bar code can be performed as follows.

A bar code pattern is formed on an outer portion of cloth when the cloth is properly folded. For example, in the case of shirt, a bar code pattern is formed, as shown in FIG. 9, on the pocket 83 or the back 84 of the shirt 81, either of which can be seen through the wrapper 82. In the case of a bedsheet, a bar code pattern is formed, as shown in FIG. 10, on a portion 86 (upper right portion in the drawing) of the bedsheet 85, which comes out to an outer surface as the bedsheet is folded. The bar code can be read by using optical readers as shown in FIGS. 1 to 6.

By providing clothes with a bar code for recording information on client or the commodity, it is possible to manage the clothes effectively. Moreover, when such clothes are collected in a laundry, it is possible to read the bar code attached to the clothes thereby permitting the clothes to be processed by means of computer at the counter of laundry so as to make it possible to rapidly issue a receipt recording a charge and delivery date on the basis of information from the bar code.

In the present invention, the transparent pattern and the infrared light for detection are invisible to the naked eye. Therefore, it may be difficult to irradiate a transparent bar code region with infrared light properly. This problem however can be solved by forming a mark indicating the region of the transparent bar code. This mark may be a colored mark containing a dye, or a transparent mark containing a fluorescent material capable of emitting a visible light upon excited with ultraviolet light.

Specific examples of such a mark are shown in FIGS. 11A to 11C. In these drawings, the transparent bars are illustrated as black bars for convenience sake. In FIG. 11A, the region of transparent bar code 2 is surrounded by a frame line 3a. In the cases of FIGS. 11B or 11C, a mark 3b or 3c is printed at the beginning of the region of transparent bar code 2. In some cases, a transparent mark containing a fluorescent material or a colored mark may be printed so as to cover the region of the transparent bar code.

When a colored mark is printed in the vicinity of the transparent bar code, a reader provided with a visible guiding beam source is employed. One example of such a reader (a handy scanner) is shown in FIG. 12. This handy scanner 91 is provided, in addition to an infrared light source 93 and an infrared detector 94, with visible guiding beam source 95 in parallel with the infrared light source 93. An optical fiber 97 is connected to the handy scanner 91. Since this visible guiding beam should preferably be excellent in directivity, the employment of laser beam is preferable. According to this handy scanner, it is possible to accurately irradiate the region of the transparent bar code with infrared light by preliminarily irradiating the beginning point of the transparent bar code indicated by the colored mark with the guiding beam.

Figure 13:
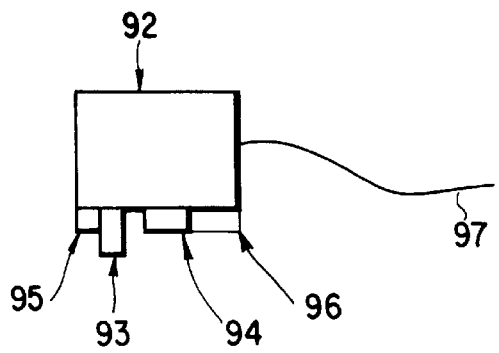
FIG. 13 is a schematic view showing the construction of another example of an optical signal reader for reading a transparent pattern with a transparent mark in the vicinity thereof.

When a transparent mark containing a fluorescent material is printed in the vicinity of the transparent bar code, a reader provided with a visible guiding beam source and an ultraviolet light source is employed. One example of such a handy scanner is shown in FIG. 13. This handy scanner is similar in construction to that shown in FIG. 12 except that it is further provided with an ultraviolet light source 96. According to this handy scanner, the transparent mark is irradiated with ultraviolet light to be visualized, and then the beginning point of the transparent bar code indicated by the transparent mark is irradiated with the guiding beam thereby making it possible to irradiate the transparent bar code region with infrared light accurately.

The method of detecting infrared light from the transparent pattern as explained above can also be utilized as a method for preventing the counterfeiting of certificates or prepaid cards.

There have been proposed several methods for preventing the counterfeiting of certificates, etc. However, none of these methods have been proved to be satisfactory. For example, a method of forming a relief on a certification photograph by strongly pressing a stamp thereon is known since a long time ago. However, it is quite possible to form almost the same relief as that of the true one by molding the shape of the true relief with clay thereby manufacturing a stamp. A method of stamping a tally impression on a certification photograph is also known since a long time ago. However, the counterfeiting of the image of tally impression can be performed now without difficulty by making use of electronic means. A method of adhering a seal printed with a highly elaborate picture or with a hologram on a certification photograph is also known. It may be possible for a counterfeiter to peel off the seal and the true photograph, and adhere a false photograph in place of the true photograph. However, it may be very difficult for the counterfeiter to reproduce the seal in high precision. Namely, these methods are based on the idea of inhibiting the counterfeiting by increasing the counterfeiting cost. However, since the manufacture of such a high precision seat requires a technique of high level as well as a high manufacturing cost, this method is not widely applicable to general certificates.

It may be conceivable for the prevention of counterfeiting to print, in addition to visible information such as photograph, tally impression or signature for certifying a document to be genuine, a pattern corresponding to the visible information by making use of a transparent ink containing a fluorescent material on the surface of the document. In this method, if the information obtained from the transparent pattern agrees with the visible information, then the document is confirmed to be genuine. However, the presence of such a transparent pattern (such as bar code) can be easily recognized by irradiating the certificate with ultraviolet light by employing an inexpensive UV lamp (black light) which is commercially available. Furthermore, it is relatively easy for a counterfeiter to counterfeit the visible information and then to form a transparent pattern imitating the original pattern by making use of fluorescent paint available in the market.

In the present invention, a transparent pattern is formed on a certificate, the pattern being made of a material capable of absorbing infrared light of specific wavelength, and corresponding to the visible information such as a photograph, a tally impression, or a signature for certifying the document. The confirmation of the document is performed by heating or irradiating with infrared light the transparent pattern region so as to detect infrared light from the transparent pattern region, and then comparing the information obtained from the transparent pattern with the visible information. In this case, the transparent pattern may be printed at a position apart from that of the visible information. Alternatively, a transparent film may be formed on the visible information, and the transparent pattern corresponding to the visible information may be formed on this transparent film. The shape of the transparent pattern may be a bar code or an image corresponding to the visible information.

A specific example of the above method will be described below. For example, when a document with a seal impression thereon is submitted by an applicant and is approved by an authorized person, a replication of the image of the seal impression is printed on the document by the authorized person by making use of a transparent ink. The existence of the transparent pattern of replication is invisible to the naked eye. Whether the certification document is genuine or not is determined as follows. First, the image of the seal impression is read by means of an image reader. On the other hand, the transparent pattern is read by means of a reader provided with an infrared light source and an infrared detector. When information obtained from the genuine document is processed with a computer, the image of the seal impression would be found to be identical with the image of the transparent pattern. However, if only the seal impression on the document is counterfeited by a counterfeiter who does not know the existence of the transparent pattern, the information on the transparent pattern cannot be detected by the above reader. Therefore, it is found that the document is counterfeited. In order to counterfeit such a document as described above, it required to provide an optical reader using infrared light, a computer technology and a printer, so that the counterfeiting cost would be very high, thus suppressing any attempt to counterfeit a document. Further, the region of the transparent pattern may be covered with a transparent film. In this case, it is impossible to find out the transparent pattern to examine contact angles of water droplets, resulting in improvement of security.

Next, a method of preventing counterfeiting of a prepaid card will be explained. In the case of telephone card, the remaining sum or remaining number of telephone calls available for use is recorded in the form of magnetic information, and also it is approximately indicated by a punch hole for the convenience of the user. The counterfeiting of such a prepaid card may be prevented by comparing the magnetic information recorded therein with the information obtained from the position of the punch hole, thereby checking the consistency of the remaining number of telephone calls. However, it is possible for a counterfeiter to decode the magnetic information recorded in the prepaid card by means of a magnetic reader and rewrite the magnetic information as well as to hide the punch hole with an adhesive tape. Thus, the counterfeiter can easily counterfeit the prepaid card such as telephone card.

In a method of preventing counterfeiting of prepaid card according to the present invention, there is formed, on the prepaid card, a plurality of transparent patterns corresponding to remaining sums, for example, remaining numbers of telephone calls, and one of said patterns corresponding to a remaining sum available for use is punched at the time when the prepaid card is used, thereby making a hole.

Figure 14A:
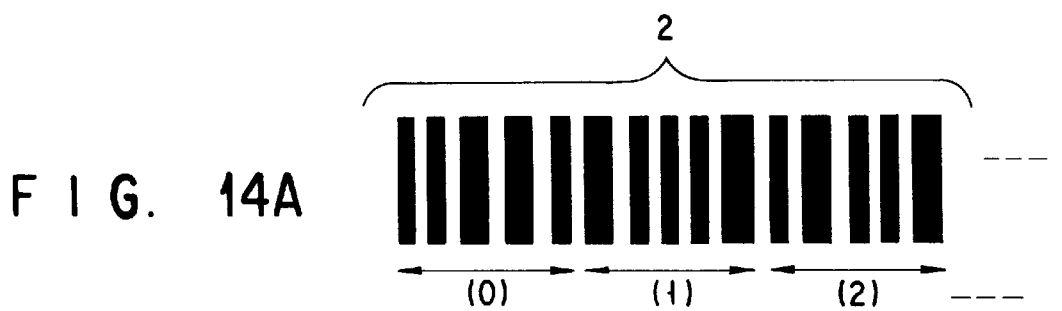
FIGS. 14A, 14B, and 14C respectively shows a plan view illustrating a transparent bar code pattern and a punch hole to be formed on a prepaid card.
Figure 14B:
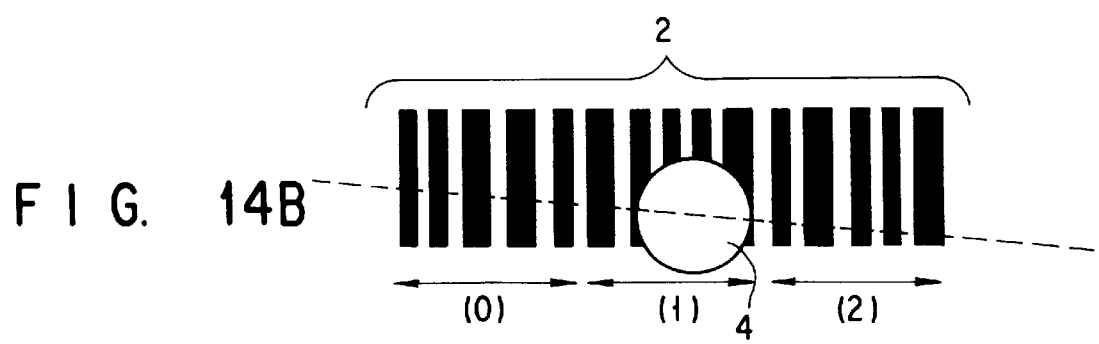
Figure 14C:
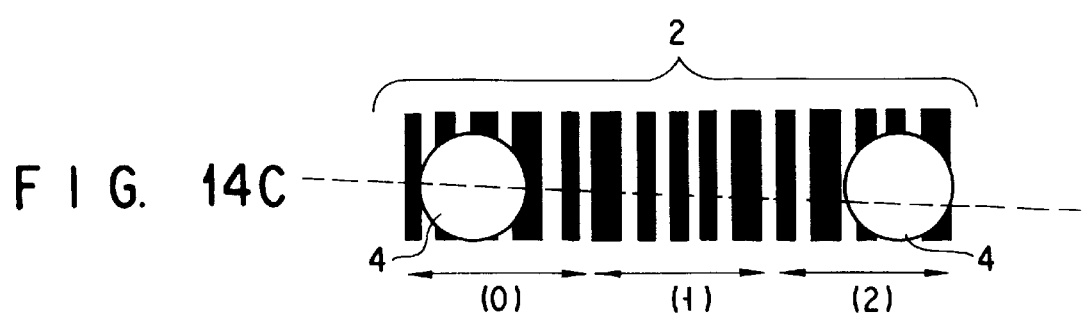

For example, as shown in FIG. 14A, on a prepaid card, transparent bar code characters made of a material containing an infrared absorbing agent are formed corresponding to the remaining numbers of telephone calls. In this drawing, the transparent bars are depicted as black bars for convenience sake. However, it should be understood that as a matter of fact these bars are invisible to the naked eye. The numerals, for example, 0, 1, 2, etc., depicted at the lower portion of the drawing represent the remaining numbers of telephone calls, i.e. 0%, 10%, 20%, and so on. As shown in FIGS. 14B and 14C, at the time when the prepaid card is used, the region of transparent bar code character corresponding to the remaining number of telephone calls is punched, thereby making a hole.

In order to check the remaining number of telephone calls of this prepaid card, used is an optical reader comprising an infrared light source and an infrared detector. Namely, the transparent bar code is irradiated with infrared light while scanning so as to pass on the punch holes, and infrared light radiated or reflected from the region of bar code is detected by the detector. In this case, it is impossible to read a portion of the bar code pattern which has been punched. Therefore, the remaining number of telephone calls available for use can be indicated by the minimum number that cannot be read. For example, referring to FIG. 14B, the transparent bar code character corresponds to the number 1 cannot be read, indicating that the remaining number of telephone calls available for use is not more than 10%. In the case of FIG. 14C, two transparent bar code characters corresponds to the numbers 2 and 0 cannot be read, indicating that the remaining telephone calls available for use is 0%.

It may be possible for a counterfeiter to decode the magnetic information recorded in the prepaid card by means of a reader, to rewrite the magnetic information so as to make the remaining telephone calls available for use to be 100%, and to hide the punch hole with an adhesive tape. However, it would be very difficult to reproduce the transparent bar code characters because they are invisible to the naked eye. Therefore, as for a prepaid card on which the transparent bar code characters are not reproduced, although the remaining number of telephone calls obtained from the rewritten magnetic information indicates 100%, the remaining number of telephone calls available for use would be 0% according to the reading of the transparent bar code characters. From this discrepancy, the counterfeiting of the prepaid card can be easily revealed.

In the present invention, methods other than those utilize infrared light can be used to obtain signals with high S/N ratio from a transparent pattern formed on a substrate.

Figure 15:
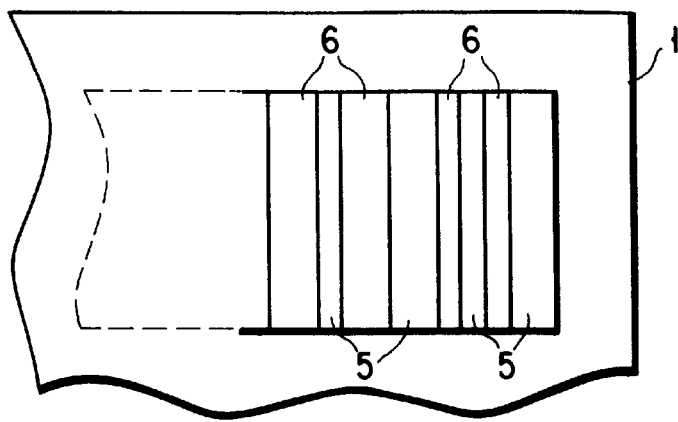
FIG. 15 shows a plan view of a pattern formed according to the present invention.

For example, a method can be used in which a transparent pattern containing a fluorescent material and a transparent pattern containing an ultraviolet-absorbing agent are formed on a substrate. Specifically, as shown in FIG. 15, a pattern of transparent bars 5 containing a fluorescent material and a pattern of transparent spaces 6 containing an ultraviolet-absorbing agent are formed on a substrate 1.

Figure 16:
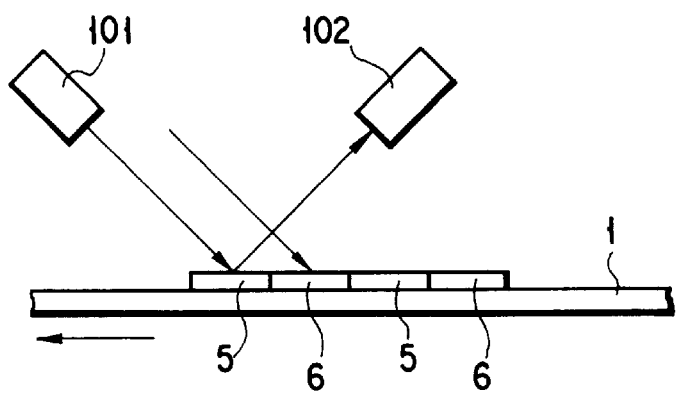
FIG. 16 is a schematic view explaining the principle of a reader for a pattern formed according to the present invention.

In order to read such a bar code pattern, used is an apparatus, as shown in FIG. 16, that comprises a light source 101 for irradiating the bar code region on the substrate 1 with ultraviolet light and a detecting means 102 such as a photodiode for detecting fluorescence emitted from the bars 5. There is not any particular restriction regarding the arrangement of light source 101 and the detecting means 102. In this case, fluorescence is emitted from the bars 5, but not from the spaces 6. Therefore, even if a sheet of white paper containing a fluorescent whitening agent is employed for the substrate 1, it is possible to obtain signals with high S/N ratio from the pattern of bars 5 without picking up noise signals from the substrate 1, since the regions of the substrate 1 excluding bars 5 are covered by the pattern of spaces 6.

As for the ultraviolet absorbing agent for forming the pattern of spaces, fine particles of zinc oxide or titanium oxide may be employed. These fine particles are employed for various end-uses such as cosmetics. When an ultraviolet absorbing agent as mentioned above is employed, the solvents should preferably be selected from water and ethyl alcohol in view of environmental safety. Therefore, the polymer for forming the pattern of spaces should preferably be selected from synthetic polymer materials such as polyvinyl alcohol and polyvinyl butyl or natural polymer materials such as starch which are compatible with the aforementioned solvents. The ultraviolet absorbing agent should preferably be dispersed in the form of an ultra fine particles in the aforementioned polymer.

There is any particular restriction regarding the fluorescent material for forming the pattern of bars as far as it is capable of absorbing ultraviolet light and emitting fluorescence of visible region. For example, fluorescent materials which are known as laser dyes or as fluorescent whitening agents may be employed, taking the environmental safety into consideration in the selection of these materials. Examples of such fluorescent materials are shown in Table 1, where $\lambda_{max}$ indicates absorption wavelength. There is not any particular restriction regarding the polymer for forming the pattern of bars. For example, the same kinds of polymer as applicable to the pattern of spaces may be employed. The content of the fluorescent material in this case should preferably be in the range of 1 to 6% by weight based on the polymer. If the content of the fluorescent material deviates from above range, the intensity of fluorescence emitted from the pattern of bars would likely be lowered.

TABLE 1

| Fluorescent materials | λmax (nm) | Fluorescence wavelength (nm) | Appearance |
|---|---|---|---|
| QUI | 310 | 370–410 | white |
| PPO | 303 | 365 max. | white |
| PPF | 324 | 368 max. | white |
| p-quaterphenyl | 297 | 362–390 | white |
| BBD | 314 | 372–405 | white |
| Polyphenyl 1 | 308 | 362–412 | white |
| BiBuQ | 313 | 364–410 | white |
| Quinolone 390 | 355 | 380–400 | white |
| TBS | 320 | 365–410 | white |
| α-NPO | 333 | 391–425 | white |
| PBBO | 327 | 386–420 | white |
| DPS | 340 | 394–416 | white |
| Stilbene 1 | 350 | 405–446 | white |
| BBO | 340 | 401–419 | white |
| Stilbene 3 | 350 | 408–465 | white |
| Carbostyryl 7 | 350 | 408–420 | white |
| POPOP | 358 | 411–454 | white |
| Coumarin 4 | 372 | 460–560 | white |

According to this method, it is possible to minimize the increase in thickness of the pattern region when a new pattern is printed again on the original pattern. In the case of the conventional method in which only the pattern of bars containing a fluorescent material is printed, first an ultraviolet-absorbing agent is coated or a seal containing an ultraviolet-absorbing agent is adhered on the entire surface of the pattern region, and then a pattern of bars containing fluorescent material capable of absorbing ultraviolet light is printed again. Therefore, the pattern region will become thicker as the printing is repeated many times, thereby lowering the flatness of the pattern region. As a result, when a paper sheet is mechanically fed, jamming may likely be caused. Whereas, according to the method of this invention, new patterns of bars and spaces are formed directly upon the underlying patterns of bars and spaces, thereby making it possible to hide the underlying patterns. Therefore, the thickness of the pattern region would not become so large, maintaining the flatness of the surface of the pattern region. As a result, paper feed can be performed without any trouble.

In the present invention, another method of reading a pattern may be used in which the angle of incident light to a transparent pattern formed on a substrate as well as the angle of reflected light from the transparent pattern are set substantially identical with the Brewster angle, and the reflected light from the transparent pattern is detected. Specifically, in order to read a transparent pattern in the aforementioned manner, employed is a reader comprising a means for holding the substrate with a transparent pattern, a light source for irradiating the pattern region on the substrate with incident light at an incident angle of 50 to 60°, and a means for detecting reflected light from the pattern formed on the surface of the substrate that are positioned symmetrical with respect to the light source.

As for the materials for forming the pattern, polymer materials are most preferable. Examples of such polymer materials are synthetic polymer materials such as polystyrene, polyester, polycarbonate, nylon, vinylon, methylmethacrylate, polyarylate, polysulfone, polyvinyl alcohol, polyvinyl butyral, polyethylene and polypropylene; and natural polymer materials such as starch. It is also possible to employ a ceramic film formed for example of silicon oxide or a wax formed of a mixture of low molecular-weight compounds.

Figure 17:
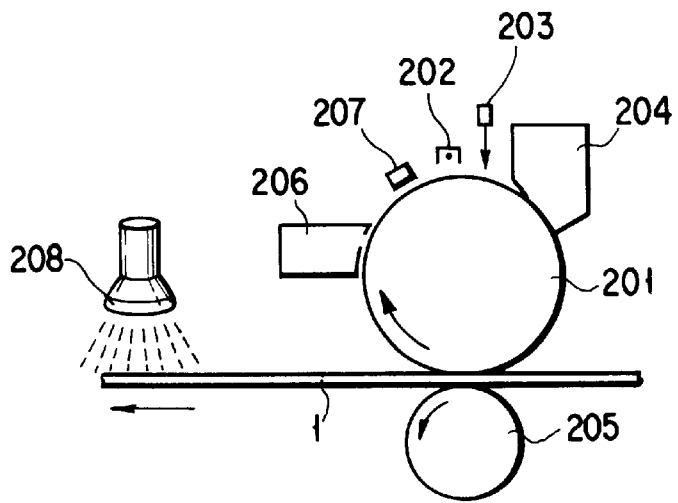
FIG. 17 is a schematic view illustrating the construction of a laser beam printer used for forming a pattern according to the present invention.
Figure 18:
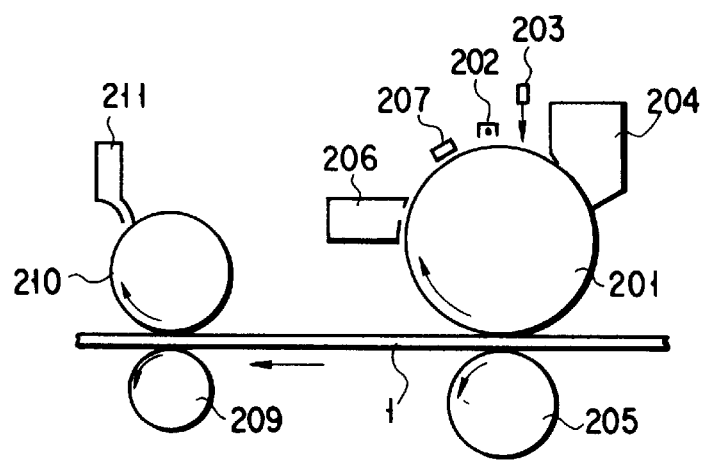
FIG. 18 is a schematic view illustrating the construction of another example of a laser beam printer used for forming a pattern according to the present invention.

Since reflected light from the surface of the pattern is detected in this method, the surface of the pattern should preferably be flat. The flattening of the surface of the pattern can by performed for example by improving the fixing step in the process of forming a pattern by making use of laser beam printer of electrophotographic system using a transparent toner comprising a polymer. Namely, when a laser beam printer as shown in FIG. 17 is employed, a photoconductive layer formed on the surface of an electrostatic drum 201 is charged by a charger 202, and then exposed to laser beam emitted from a laser 203 so as to allow a transparent toner from a developer 204 to be adhered onto the photoconductive layer thereby performing the development of the pattern image. The transparent toner is then transferred onto the surface of a substrate 1 passing through between a roller 205 and the electrostatic drum 201, thereby forming the pattern on the substrate 1. Subsequently, the electrostatic drum 201 is cleaned by a cleaner 206 and then deelectrified by a charge remover 207. The substrate 1 with the pattern is further passed forward to carry out the fixing of the pattern. At this time, if a heater 208 is disposed apart from the substrate 1, the fixing of the pattern on the substrate 1 can be effected and at the same time the flattening of the surface of the pattern can be realized. Alternatively, when a roller 209 and a heat roller 210 are employed in the fixing step, the fixing of the pattern on the substrate 1 through heating as well as the flattening of the surface of the pattern can be realized if a wax feeder 211 is disposed over the heat roller 210 so as to feed and coat the wax on the surface of the pattern.

Figure 19:
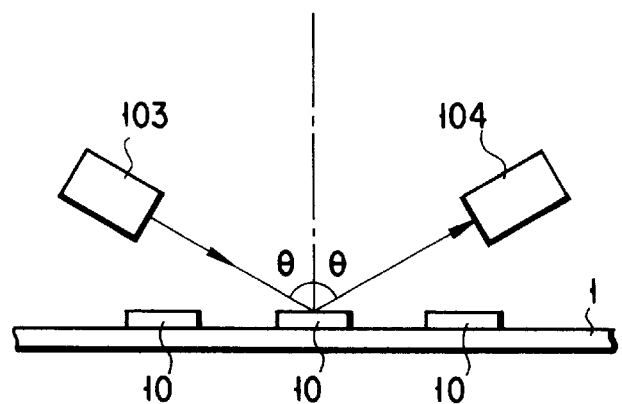
FIG. 19 is a schematic view explaining the principle of a reader for a pattern formed according to the present invention.

In order to read the pattern formed on the substrate according to this method, the substrate 1 is held at a predetermined position of reading the pattern as shown in FIG. 19, and the pattern-reading is performed by using an optical signal reader comprising a light source 103 for irradiating the region of a transparent pattern 10 formed on the substrate 1 with incident light at an incidence angle θ of 50 to 60° which corresponds approximately to the Brewster angle according to the material constituting the pattern 10, and a detecting means 104 for detecting reflected light from the pattern 10 formed on the surface of the substrate 1 which are positioned symmetrical with respect to the light source 103. The incident light to be irradiated from the light source 103 may be visible light or infrared light.

The Brewster angle θ is determined by the equation: $\tan\theta=n$, where n is a diffractive index of a material constituting the pattern. The diffractive index of the aforementioned polymer materials is around 1.5 in most cases, so that the corresponding Brewster angle would be in the range of 50 to 60°. If the light source 103 and the detecting means 104 are so arranged as to coincide with this angle range, the incident light can be reflected from the pattern 10 in the total reflection mode. On the other hand, the scattering of light may be caused on the substrate made of paper for instance. Therefore, a signal having a high S/N ratio can be obtained.

Figure 20:
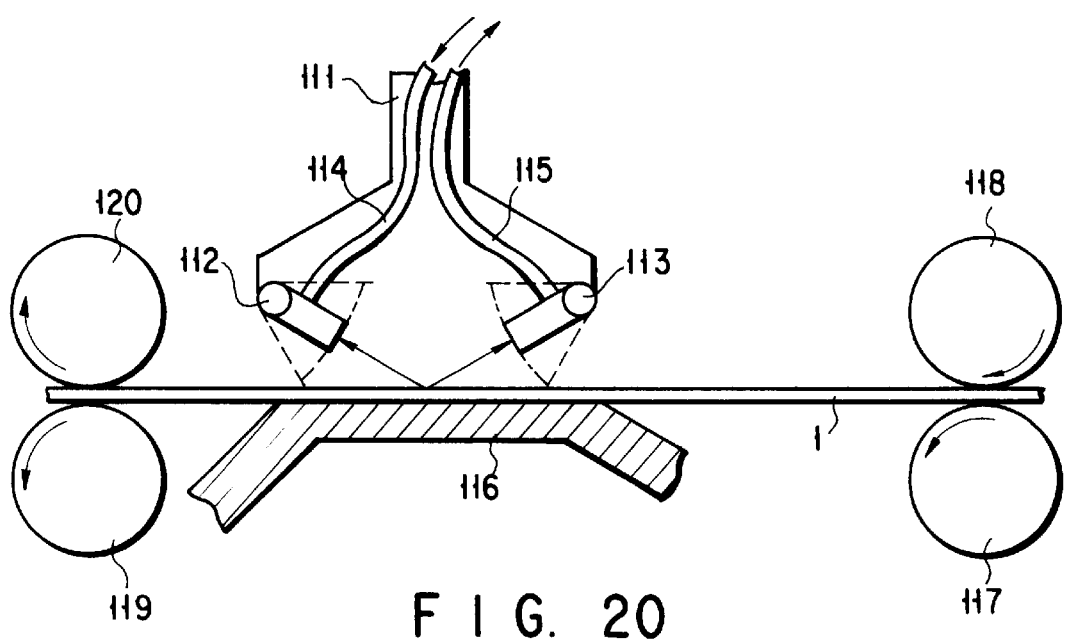
FIG. 20 is a schematic view showing the construction of a example of an optical signal reader for a pattern formed according to the present invention.

More specifically, an optical signal reader as shown in FIG. 20 can be employed. Referring to FIG. 20, a light source optical system 112 and a reading optical system 113 are symmetrically and pivotally mounted on the head 111. Accordingly, the incident angle of the incident light from the light source optical system 112 can be adjusted to the Brewster angle in conformity with the material constituting the pattern 10, and at the same time the reading optical system 113 can be adjusted so as to make it possible to detect the reflected light from the pattern 10. After adjusting the positions both of the light source optical system 112 and the reading optical system 113, light from a light source (not shown) is transmitted through an optical fiber 114 to the light source optical system 112, from which the light is emitted onto the surface of the substrate 1. The light is then reflected by the pattern 10 formed on the surface of the substrate 1 and the reflected light is detected by the reading optical system 113 to be further transmitted via an optical fiber 115 to the detector (not shown), the resultant detected light being displayed on an oscilloscope. The head 111 is disposed over a supporting table 116 functioning as a holding means for maintaining the horizontal state of the substrate 1. The substrate 1 is transferred by way of a pair of transfer rollers 117 and 118 to the supporting table 116, and then taken out of the supporting table 116 by way of a pair of takeout rollers 119 and 120.

Since the incident light is emitted obliquely onto the pattern and the reflected light is detected at an oblique angle, the detector is supplied with a signal corresponding to the width component which is equivalent to the sine of the width of pattern. For example, when a pattern of bar code is read from a mail being transferred at a high speed, the input time of signal to the detector is determined according to the time required for the aforementioned width component of the bar code to pass through, therefore the input time of the signal is required to be sufficiently longer than the response time of the detector. Consequently, if the transferring speed is represented as r [m/sec] and the response time of the photodiode is represented as t [sec], the width w of the bar code should be set so as to meet the equation of w>tr/sin (90−θ).

EXAMPLES

This invention will be further explained with reference to the following examples.

Example 1

Polyacrylonitrile powder is dispersed as an infrared-absorbing agent in a 5 wt % aqueous solution of polyvinyl alcohol at a ratio of 2 wt % based on the polyvinyl alcohol. By an ink jet printer using the dispersion as an ink, a bar code pattern consisting of ten parallel bars, each having a width of 4 mm and a length of 20 mm with a spacing of 4 mm, is formed on a plain paper having visible characters printed in advance. When the paper is observed from the front thereof, the printed characters on the paper can be identified without any trouble.

Then, this paper is subjected to an experiment for reading the bar code pattern by heating it and detecting with a thermoelectric cooling type HgCdTe detector. The specification of this detector is: allowable temperature range 0 to 250° C.; allowable wavelength region 3 to 5.3 $\mu$m; minimum detectable dimension 85 $\mu$m; and operation distance 13 mm. Specifically, a 100 W infrared lamp is positioned 3 cm above the paper to heat the paper. After the paper is heated, the window of the detector is immediately disposed in parallel with the surface of the paper, and the detector is scanned over the surface of the paper at a velocity of 3 m/sec to detect the ON/OFF of the signals. As a result, ON signals are obtained due to heat radiated from the pattern of bars. Further, when a filter for selectively transmitting infrared light of 4 to 5 $\mu$m in wavelength is disposed in front of the detector and the monitoring of the bar code pattern is performed in the same manner as described above, the S/N ratio has been enhanced by 10 times.

Next, the paper is placed on a hot plate heated to 80° C., and a monitoring is performed by making use of a thermal image analysis system (Thermovision 900, Toyo Technica Co.). As a result, it is possible to identify the pattern of bars on the monitoring CRT. Likewise, this paper is heated via a filter for selectively transmitting infrared light of 4 to 5 $\mu$m in wavelength by means of an infrared lamp, and a monitoring is performed by making use of the same thermal image analysis system as mentioned above. As a result, it is confirmed on the monitoring CRT that the pattern of bars is selectively heated. As explained above, since it is possible to read the bar code pattern without requiring a scanner, the bar code pattern can be taken up as an image by a computer thereby allowing the image of the bar code pattern to be analyzed.

Example 2

Cyanobiphenyl is dispersed as an infrared absorbing agent in a 5 wt % aqueous solution of polyvinyl alcohol by making use of sodium stearate as a surfactant. The content of cyanobiphenyl is 1 wt % based on the polyvinyl alcohol. By an ink jet printer using the dispersion as an ink, a bar code pattern consisting of ten parallel bars, each having a width of 4 mm and a length of 20 mm with a spacing of 4 mm, is printed on a plain paper having visible characters printed in advance. When the paper is observed from the front thereof, the printed characters on the paper can be identified without any trouble.

Then, this paper is heated by means of a hair dryer. After this paper is heated, the window of a thermoelectric cooling type HgCdTe detector is immediately disposed in parallel with the surface of the paper, and the detector is scanned over the surface of the paper at a velocity of 3 m/sec to detect the ON/OFF of the signals. As a result, ON signals are obtained due to heat radiated from the pattern of bars.

Example 3

Polyester pellet and polyacrylonitrile pellet are respectively pulverized into particles having an average particle size of 11 $\mu$m, thereby obtaining a toner containing no pigment. The ratio of the polyester particles to the polyacrylonitrile particles is controlled to 1:1 by weight. By a laser beam printer using the mixture as a toner, a bar code pattern consisting of ten parallel bars, each having a width of 4 mm and a length of 20 mm with a spacing of 4 mm, is printed on a plain paper having visible characters printed in advance. When the paper is observed from the front thereof, the printed characters on the paper can be identified without any trouble.

Then, a 100 W infrared lamp is positioned 3 cm above the paper to heat the paper. After the paper is heated, the window of the thermoelectric cooling type HgCdTe detector is immediately disposed in parallel with the surface of the paper, and the detector is scanned over the surface of the paper at a velocity of 3 m/sec to detect the ON/OFF of the signals. As a result, ON signals are obtained due to heat radiated from the pattern of bars.

Example 4

Pulverized polyacrylonitrile is dispersed as an infrared absorbing agent in a 5 wt % aqueous solution of polyvinyl alcohol to obtain an ink for use in an ink jet printer. Then, by making use of an ink jet printer, a transparent bar code pattern consisting of parallel bars, each having a width of 4 mm and a length of 20 mm with a spacing of 4 mm, is printed on a plain paper having visible characters printed in advance. When the paper is observed from the front thereof, the printed characters on the paper can be identified without any trouble.

Then, as shown in FIG. 7, the paper with the transparent bar code is set on a reader. The bar code region on the paper is irradiated with a laser beam, and Raman scattering light from the bar code region is converged by means of lens to disperse with a spectroscope and then observed by making use of CCD. When the wavenumber of the spectroscope is set to 2250 cm$^{-1}$, the image of bar code can be obtained through the CCD. This image obtained is then analyzed by means of a computer to obtain the bar code information.

Example 5

A thread of polyacrylonitrile fiber (acrylic fiber called Zacron, Mitsui Toatsu Co.) sewed on clothes each made of nylon, polyester, cotton or silk to form a bar code pattern by making use of a sewing machine. In this case, formed is the bar code of CODE 39 system where alphanumeric characters from 0 to 9 and from a to g are represented by narrow bars having a width of 2 mm and wide bars having a width of 6 mm.

Then, the clothes with the bar code formed of a thread of acrylic fiber is irradiated with infrared light via a filter capable of transmitting an infrared light of around 2225 cm$^{-1}$ from a siliconite heating element, thereby selectively heating the bar code pattern. This bar code pattern is then observed as an image by making use of Thermovision 900 (Toyo Technica Co.). On the CRT screen, the portions where the threads exist are displayed in white, whereas the portions without threads are displayed in black. However, it is possible to display the color tone of the general bar code by reversing the color tone of the image. Thus, it is possible to read the bar code information by an image processing with a computer.

Since the acrylic fiber cannot be dissolved by water or by a chlorinated organic solvent, it is possible to read the bar code information in the same manner as mentioned above even after washing with water in a washing machine and sunlight drying for three hours or after dry-cleaning with a dry cleaner.

As a matter of fact, a shirt attached with a cloth 2 cm×5 cm in size with a bar code formed by sewing a thread of acrylic fiber is subjected to a ten-time repetition of a dry cleaning followed by ironing, and subsequently the reading of the bar code is performed, finding that the bar code on the cloth can be read without any trouble.

In another test, the samples of the aforementioned cloth are exposed to UV light from a high pressure mercury lamp for 30 days, and subsequently the reading of the bar code from the samples is performed, finding that it is also possible to read the information from every samples without any trouble.

When polyacrylonitrile (Zacron, Mitsui Toatsu Co.) containing 10% by weight of tributyl phosphate as a plasticizer is employed for printing a bar code of CODE 39 system by making use of a bar code character rings which is capable of heating up to 200° C., the almost the same results as explained above can be obtained.

Example 6

Characters of TOSHIBA 96110 are printed with a black ink on a plastic card made of polystyrene having a thickness of 1.9 mm. Then, a polyethylene film 8 μm in thickness is laminated on this plastic card and heat-sealed thereon at a temperature of 170° C. On the other hand, a styrene-acrylonitrile copolymer (weight ratio=7:3, Aldrich Co.) is dissolved in 1,1,2-trichloroethylene at a ratio of 1 wt % by weight to prepare a solution, which is then used as an ink for an ink jet printer, and a transparent bar code of CODE 39 system corresponding to the characters of TOSHIBA 96110 is printed on the polyethylene film.

It is impossible to recognize the presence of the transparent bar code on the card with naked eye. The card with the bar code is irradiated with infrared light via a filter capable of transmitting an infrared light of around 2225 $cm^{-1}$ from a light source apart from the card by 2 cm for 30 seconds, thereby selectively heating the bar code pattern. The infrared light radiated from the bar code pattern is then detected via a filter with an MCT detector. The speed of scanning is set to 1 cm/sec. As a result, the bar code can be displayed on an oscilloscope where regions indicating infrared signals and regions indicating no infrared signal are clearly distinguished. These signals are then decoded to obtain information of TOSHIBA 96110. Meanwhile, the characters printed with a black ink on the same card are read by means of an image reader connected to a computer to obtain the information of TOSHIBA 96110. From the fact that the information obtained from the transparent bar code is identical with the printed characters, it can be confirmed that the card is genuine. On the other hand, in the case of a card that the transparent bar code is removed as a result of counterfeiting, the information from the transparent bar code cannot be obtained, thus determining the card as being counterfeited.

Example 7

A stamp is put on a sheet of paper. Then, a polyethylene film 8 μm in thickness is laminated on this paper and heat-sealed thereon at a temperature of 170° C. Then, the image of the stamp is read using a scanner and stored in a computer. Subsequently, a transparent image corresponding to the image of the stamp is printed by making use of the same transparent ink and the same ink jet printer as described in Example 6.

It is impossible to recognize the presence of the transparent bar code on the paper with the naked eye. Then, the paper with the bar code is irradiated with infrared light via a filter capable of transmitting an infrared light of around 2225 $cm^{-1}$ from a light source apart from the paper by 2 cm for 30 seconds, thereby selectively heating the region of the image of stamp formed with a transparent ink. The infrared light radiated from this image formed of the transparent ink is then detected as an image via a filter by making use of a Thermovision 900 (Toyo Technica Co.). After this image is binarized to remove marginal blur, the resultant image is reversed and displayed on a computer display. On the other hand, the image of the stamp itself on the same paper is read using a scanner. In this case, it can be confirmed that the paper is genuine, if the image formed with the transparent ink is identical with the image of the stamp itself. On the other hand, in the case of a paper that the transparent image is removed as a result of counterfeiting, the information from the transparent image cannot be obtained, thus determining the paper as being counterfeited.

Example 8

Ultrafine particles of zinc oxide (Sumitomo Cement Co.) is added as an ultraviolet-absorbing agent to 10 cc of a 5 wt % aqueous solution of polyvinyl alcohol to obtain a mixture comprising the polymer and zinc oxide at a ratio of 10:5 by weight. This mixture is then subjected to an ultrasonic dispersion and used for forming a pattern of spaces consisting of ten parallel lines each having a width of 3 mm and a length of 20 mm with a spacing of 3 mm, on a white postcard by making use of silk screen printing. After the printing, the patter of spaces is dried.

On the other hand, stilbene 3 (Lambda Physic Co.) which is one of laser dyes is dissolved in a 5 wt % solution of polyvinyl alcohol in ethyl alcohol at a ratio of 2 wt % based on the polymer. The resultant solution is then used for forming a pattern of bars consisting of ten bars each having a width of 3 mm and a length of 20 mm with a spacing of 3 mm, on the same postcard by silk screen printing in such a manner that each bar is disposed next to each line of the space while avoiding the overlapping between the bars and lines. After the printing, the pattern of bars is dried.

The postcard is then placed in a dark room and irradiated with ultraviolet light having a wavelength of 360 nm from a black light. As a result, fluorescence from the bar pattern having a wavelength of about 400 nm is detected. The contrast ratio between the bar pattern and the space pattern has been proved to be 10 or more.

Next, the same pattern as mentioned above is formed on a white postcard by making use of the aforementioned two kinds of solution and the ink jet printer. When reading operation is performed with a bar code reader provided with a photodiode whose detection wavelength is set to about 400 nm while irradiating the bar code pattern with ultraviolet light, it is possible to read the bar code pattern. Further, the bar code pattern is printed on various kinds of postcards each having written characters representing an address. In the case where the resultant postcards are conveyed at a speed of 4 m/sec, it is also possible to read the bar code pattern with the bar code reader in the same manner as above.

Next, a process of printing a new bar code pattern on an old bar code pattern different from the new one is repeated ten times to a postcard. When reading operation with a bar code reader is performed for the resultant postcard, it is possible to read information of the latest bar code pattern.

Example 9

A adhesive is coated on the surface of a polycarbonate film having a thickness of 5 μm. Then, the film is cut into strips each having a width of 4 mm and a length of 20 mm. Ten strips are adhered with a spacing of 4 mm on a paper sheet having printed characters thereon, thereby forming a pattern of bars. Under this condition, it is possible to completely read the original printed characters. The diffractive index of this film is 1.58 and therefore the Brewster angle is 57.7°.

Then, the angle of incident light from a light source is set to the aforementioned Brewster angle, and a photodiode is positioned symmetrical with the light source so as to make it possible to detect a reflected light from the pattern of bars. The paper is then manually scanned, thus displaying the detected signals on an oscilloscope. As a result, it is possible to obtain the reflected light from the region of the bar pattern as a signal voltage consisting of rectangular wave having a constant interval, thus making it possible to detect that the bars exist or not.

When the position of the photodiode is changed away from that determined from the Brewster angle, the intensity of the signal voltage is greatly lowered.

Example 10

A 5 wt % aqueous solution of polyvinyl alcohol is employed as an ink for use in an ink jet printer. Then, a transparent bar code pattern consisting of ten parallel bars each having a width of 4 mm and a length of 20 mm with a spacing of 4 mm, is printed on a plain paper having printed characters with the ink jet printer. When this printed paper is observed from the front thereof, the printed characters on the paper can be identified without any trouble. The diffractive index of polyvinyl alcohol is known to be in the range of 1.49 to 1.53, and therefore the corresponding Brewster angle is in the range of 56.1° to 56.8°.

The optical reader shown in FIG. 20 is employed, and the light source optical system 112 and the reading optical system 113 are adjusted such that both incident angle and reflection angle are set to 56.5°. Then, the reading of the bar pattern is performed while scanning the paper, thereby obtaining a signal voltage corresponding to the bar pattern.

Example 11

A wax which is commonly used for the manufacture of a thermal ink ribbon is coated without an addition of a pigment on a tape and dried to obtain a thermal ink ribbon for printing a transparent ink. Then, a transparent bar code pattern consisting of ten parallel bars each having a width of 4 mm and a length of 20 mm with a spacing of 4 mm, is printed on a plain paper, on which visible characters are printed in advance, with a thermal printer using above thermal ink ribbon.

Since the wax employed in this example is a mixture of various materials, the diffractive index of the wax is not clearly determined. However, when the optical reader shown in FIG. 20 is employed and the detection sensitivity of the bar code is estimated on oscilloscope while simultaneously changing the angles of the light source optical system 112 and the reading optical system 113 with the paper being kept standing, a maximum sensitivity is obtained at an angle of 55°. Then, each of these optical systems is fixed under this optimum condition and the reading of the bar pattern is performed while scanning the paper. As a result, a signal voltage corresponding to the bar pattern is obtained.

Example 12

Polyester pellets are pulverized to obtain powder having an average particle diameter of 11 μm thereby obtaining a toner containing no pigment. The toner is fed to a laser beam printer for printing a transparent bar code pattern consisting of ten parallel bars each having a width of 4 mm and a length of 20 mm with a spacing of 4 mm. With this printer, it is possible to flatten the surface of the bar pattern since the toner is fixed by an infrared heating.

Since the diffractive index of polyester is known to be 1.54, and therefore the corresponding Brewster angle is 57°. In the optical reader shown in FIG. 20, the light source optical system 112 and the reader optical system 113 are adjusted such that both incident angle and reflection angle are set to 57°. Then, the reading of the bar pattern is performed while scanning the paper. As a result, a signal voltage corresponding to the bar pattern is obtained.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

We claim:

1. A method of reading a pattern, comprising the steps of:
   heating a substrate on which an invisible pattern is formed, said pattern containing a polymer selected from a group consisting of polyacrylonitrile and an acrylonitrile-based copolymer; and
   detecting infrared light radiated from said pattern.

2. The method according to claim 1, wherein said substrate is made of cloth, and said pattern is formed by sewing a thread made of fibers of polyacrylonitrile or a acrylonitrile-based copolymer.

3. The method according to claim 1, wherein said material constituting said pattern has a higher thermal conductivity than that of said substrate.

4. The method according to claim 1, wherein a colored mark is formed in the vicinity of the pattern region on said substrate.

5. The method according to claim 1, wherein a mark comprising a fluorescent material capable of emitting visible light upon absorption of ultraviolet light is formed in the vicinity of the pattern region on said substrate.

6. A method of preventing counterfeiting of a prepaid card in which magnetic information is recorded comprising the steps of:
   forming a plurality of invisible patterns corresponding to remaining sums on said prepaid card;
   punching a hole in one of said patterns corresponding to a remaining sum available for use at the time when said prepaid card is used;
   heating a region of said patterns on said prepaid card;
   detecting infrared light radiated from said patterns; and comparing information detected from said patterns with the magnetic information recorded in said prepaid card.

7. An optical signal reader, comprising:

a means for conveying a substrate on which an invisible pattern is formed, said pattern containing a material capable of radiating infrared light of specific wavelength by heating;

a means for heating a region of said pattern formed on said substrate; and a means for detecting infrared light with a wavelength region of 3 to 5.3 $\mu$m radiated from said pattern.

8. The optical signal reader according to claim 7, wherein said means for detecting infrared light is provided with a filter capable of selecting infrared light of specific wavelength.

9. The optical signal reader according to claim 8, wherein said filter selectively transmits infrared light of 4 to 5 $\mu$m in wavelength.

10. The optical signal reader according to claim 7, wherein said detecting means comprises a HgCdTe detector.

* * * * *